(12) United States Patent
Gole et al.

(10) Patent No.: US 7,596,712 B1
(45) Date of Patent: Sep. 29, 2009

(54) METHOD AND SYSTEM FOR EFFICIENTLY ACCESSING A STORAGE REDUNDANCY GROUP

(75) Inventors: Abhijeet P. Gole, Cupertino, CA (US); Joydeep Sen Sarma, Sunnyvale, CA (US); Stephen H. Strange, Mountain View, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 525 days.

(21) Appl. No.: 11/389,339

(22) Filed: Mar. 23, 2006

(51) Int. Cl.
*G06F 11/00* (2006.01)
(52) U.S. Cl. .......................................... 714/4; 711/141
(58) Field of Classification Search ....................... None
See application file for complete search history.

(56) References Cited

U.S. PATENT DOCUMENTS

| | | | |
|---|---|---|---|
| 6,353,836 B1 * | 3/2002 | Bamford et al. | 707/203 |
| 6,523,032 B1 * | 2/2003 | Sunkara et al. | 707/8 |
| 6,711,571 B2 * | 3/2004 | Putzolu | 707/9 |
| 6,862,593 B2 * | 3/2005 | Walters | 707/8 |
| 2002/0112023 A1 * | 8/2002 | Karamanolis et al. | 709/217 |
| 2005/0234934 A1 * | 10/2005 | Mackay et al. | 707/100 |
| 2006/0129559 A1 * | 6/2006 | Sankaran et al. | 707/10 |

* cited by examiner

*Primary Examiner*—Gabriel L Chu
(74) *Attorney, Agent, or Firm*—Blakely, Sokoloff, Taylor & Zafman LLP (57) ABSTRACT

A method and system for efficiently accessing a pool of mass storage devices are described. In one embodiment of the invention, a primary storage server and a secondary storage server share a pool of mass storage devices. The secondary storage server is configured to provide read-only access to the storage pool of mass storage devices, while the primary storage server is configured to provide read and write access to the pool of mass storage devices.

20 Claims, 5 Drawing Sheets

METHOD AND SYSTEM FOR EFFICIENTLY ACCESSING A STORAGE REDUNDANCY GROUP

FIELD OF THE INVENTION

At least one embodiment of the present invention relates generally to networked-based data storage systems, and in particular, to a method and system for more efficiently accessing a group of mass storage devices from a storage server.

BACKGROUND

Figure 1:
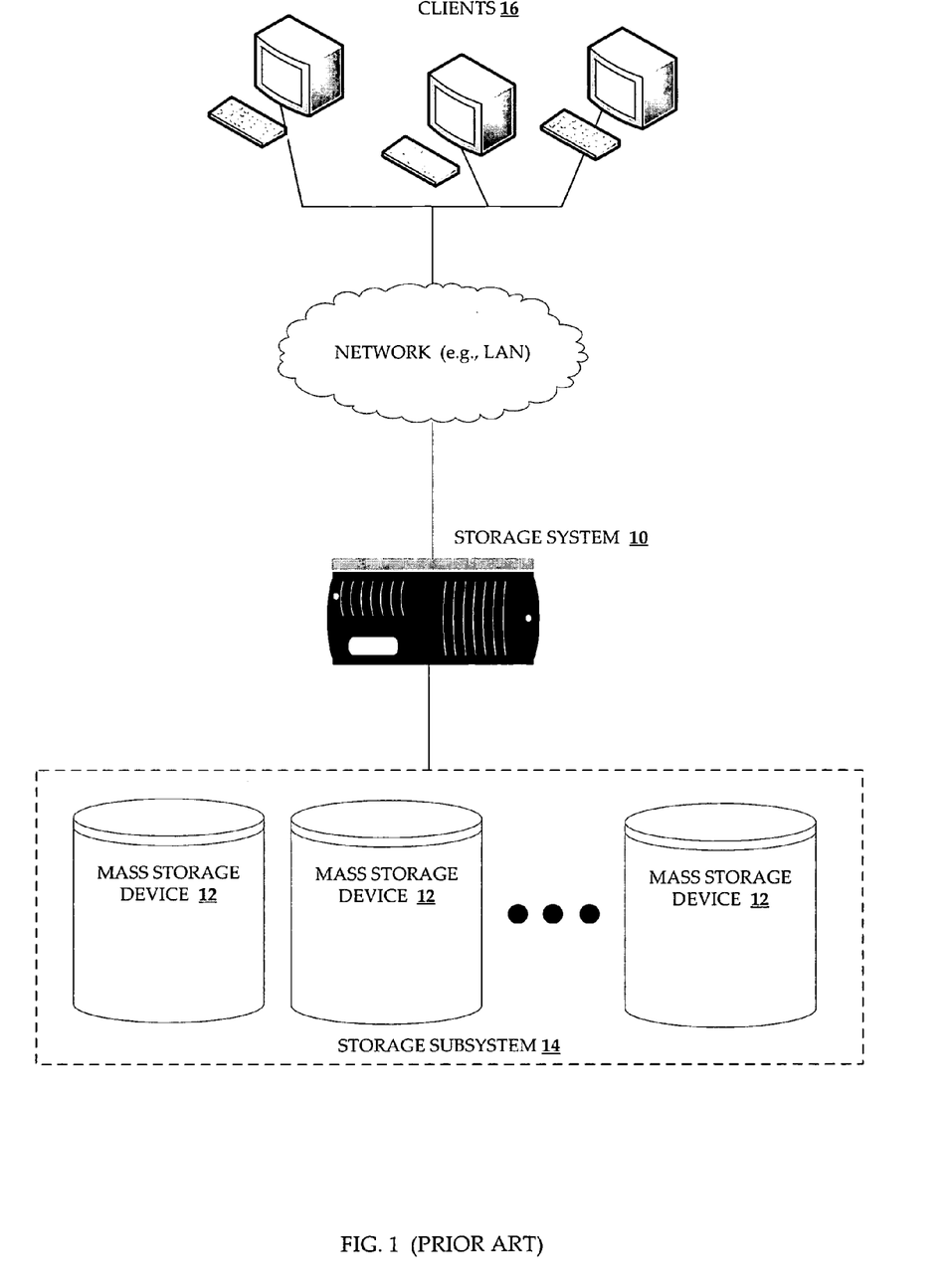
FIG. 1 illustrates a prior art network environment with a storage server to provide data storage services to clients over a network.

A typical network-based storage server provides storage services to one or more clients coupled to the storage server over a network. For example, referring FIG. 1, storage server 10 services client-initiated read and write requests by reading and writing data to the mass storage devices 12 in the storage subsystem 14 on behalf of a client 16. The mass storage devices (e.g., disks) may be organized into groups of redundant arrays generally referred to as RAID groups, or redundant array of independent disks. With RAID-based storage systems, often the system performance is limited by the processing power of the storage server 10 itself. That is, the storage subsystem 14 is often capable of throughput rates that exceed the throughput rate of the storage server 10. Consequently, in an environment such as that illustrated in FIG. 1, the performance bottleneck is often the storage server 10.

Given that a storage server tends to be the bottleneck, one way to improve throughput performance is to connect more than one storage server to a mass storage subsystem (e.g., a set of disks), such that both storage servers are capable of accessing the mass storage devices of the storage subsystem on behalf of clients. Distributed data storage systems in which one or more disks are owned by more than one storage server are known in the art. However, in such systems, complex data locking mechanisms are required to ensure data consistency, e.g., to prevent one storage server from overwriting data that is being accessed by another storage server. Not only is implementing such a locking mechanism difficult, the processing overhead associated with such a mechanism generally has a negative impact on the overall performance, thereby countering the intended effect of the additional storage server (i.e., improved throughput of the overall system).

Also known in the art are cluster-failover storage system configurations. In such a configuration, two or more storage servers, a primary storage server and a secondary storage server, are connected to a particular set of disks, and the secondary storage server can take over for the primary storage server if the primary storage server fails (i.e., a "failover"). However, the secondary storage server does not have access to the set of disks under normal circumstances (i.e., while the primary storage server is operating normally).

SUMMARY OF THE INVENTION

According to one aspect of the present invention, a computer-implemented method includes operating a secondary storage server to provide a client with access to a pool of mass storage devices owned by a primary storage server and not owned by the secondary storage server, while the primary storage server is in normal operation.

Other aspects of the invention will be apparent from the accompanying figures and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and system for efficiently accessing a pool of mass storage devices are described. In the following description, for purposes of explanation, numerous specific details are set forth in order to provide a thorough understanding of the present invention. It will be evident, however, to one skilled in the art that the present invention may be practiced without these specific details.

In certain embodiments of the invention, a pool of mass storage devices, such as disks, is shared by a primary storage server and a secondary storage server. The pool of mass storage devices is or includes a redundancy group, such as a RAID group. The pool of mass storage devices is owned by the primary storage server but not by the secondary storage server. However, the secondary storage server can provide a client with read access to the redundancy group, even while the primary storage server is in normal operation.

In this context, the term "own" is meant to indicate the nature of the principle relationship between the primary storage server and the mass storage devices. Specifically, the primary storage server has full access privileges to the mass storage devices, including read and write access, whereas the secondary storage server (which does not own the pool of mass storage devices) generally has lesser access privileges to the mass storage devices, such as read-only privileges.

Providing a primary storage server and a secondary storage server access to a shared pool of mass storage devices in this way enables efficient utilization of storage device bandwidth that may otherwise go unused.

The primary and secondary storage servers can be substantially identical, differing primarily in their designations as "primary" or "secondary" and the functionality attributed to such designations. For example, each storage server may be functionally capable of serving as the primary storage server or the secondary storage server. However, an administrator will generally designate one storage server as the primary, and another as secondary, by configuring each storage server to execute particular functions or algorithms associated with each designation (e.g., primary or secondary).

In certain embodiments of the invention, client applications that have workloads requiring mostly read operations may be configured to direct their data requests to the secondary storage server. For example, a back-up application may read data from the shared pool of mass storage devices through the secondary storage server, and write the data to a back-up device, such as a tape back-up system.

Figure 2:
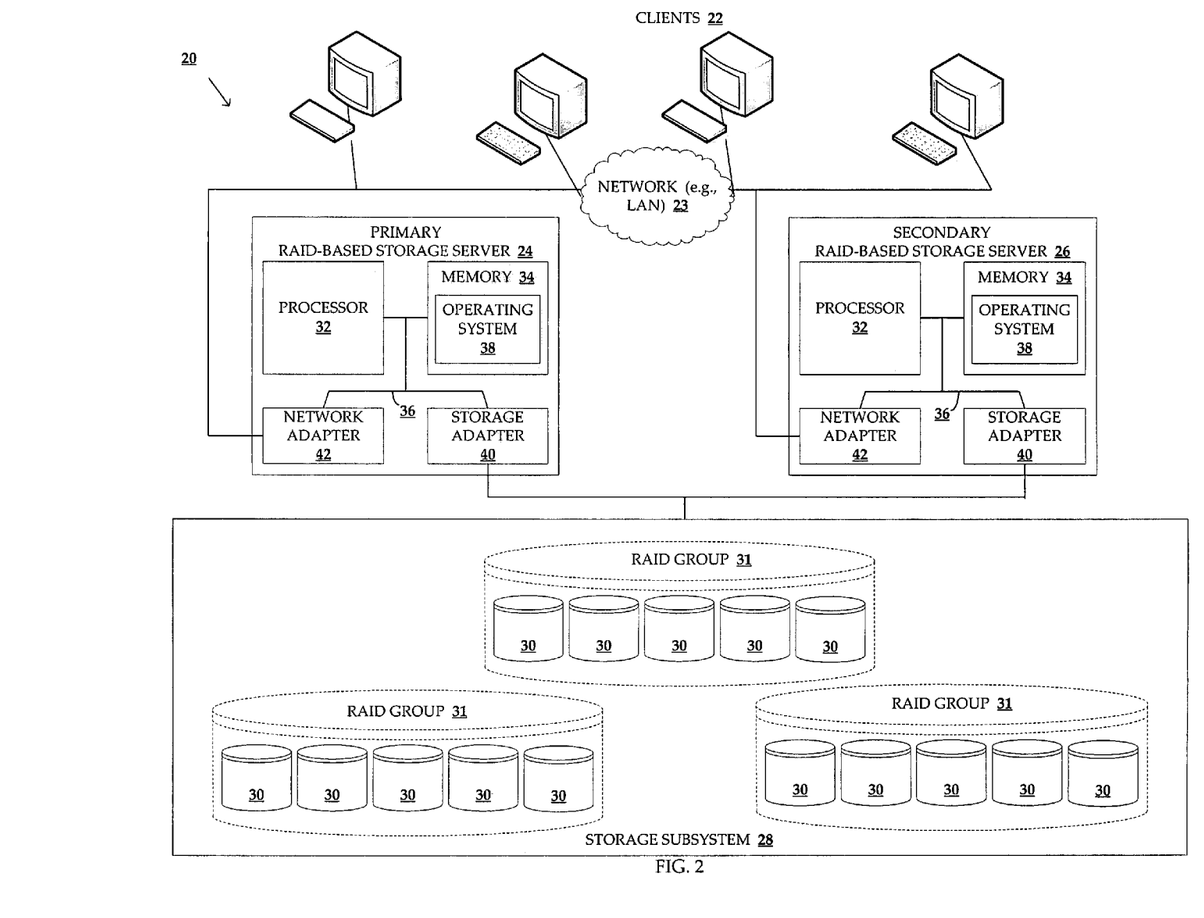
FIG. 2 illustrates an example network environment in which a storage server, according to embodiments of the invention, can be used.

FIG. 2 illustrates an example network environment 20 in which one or more storage servers, according to certain embodiments of the invention, can be used. As illustrated in FIG. 2, one or more clients 22 are coupled over a network, such as a local area network (LAN) 23, to a primary storage server 24 and a secondary storage server 26. Both the primary storage server 24 and the secondary storage server 26 are coupled to a common storage subsystem 28 consisting of a pool of mass storage devices 30. In one embodiment of the invention, the pool of mass storage devices is logically organized into one or more RAID groups. Each storage server 24 and 26 may be, for example, a file server such as used in a network attached storage (NAS) environment, a block-level storage server such as used in a storage area network (SAN) environment, or a storage server capable of operating in both of these modes. Each of the clients 22 may be, for example, a conventional personal computer (PC), server computer, workstation, or the like.

As discussed in greater detail below, each storage server 24 and 26 includes access control logic that controls the level of access that each storage server 24 and 26 has to the storage subsystem 28. Specifically, the access control logic determines whether a client can access (e.g., read or write) to the storage subsystem through a particular storage server. In general, the primary storage server 24 is configured to provide clients with full access, including read and write access, to the various mass storage devices 30 in the pool of mass storage devices. However, the secondary storage server 26 is configured to provide clients with only read access to the pool of mass storage devices.

In one embodiment of the invention, storage servers 24 and 26 receive and respond to various read and write requests from the clients 22, directed to data stored in or to be stored in the storage subsystem 28. The clients 22 typically communicate with each storage server 24 and 26 by exchanging discrete frames or packets of data formatted according to predefined network communication protocols, such as Hypertext Transfer Protocol (HTTP) and Transmission Control Protocol/Internet Protocol (TCP/IP), as well as protocols such as Network File System (NFS), Common Internet File System (CIFS), Fibre Channel Protocol (FCP) and/or Internet SCSI (iSCSI). In this context, a protocol consists of a set of rules defining how the interconnected computer systems interact with one another. However, for purposes of the present invention, a client may be a process executing directly on one of the storage servers 24 and 26. The mass storage devices in the storage subsystem 28 may be, for example, conventional magnetic disks, optical disks such as CD-ROM or DVD based storage, magneto-optical (MO) storage, or any other type of non-volatile storage devices suitable for storing large quantities of data.

Each storage server 24 and 26 may have a distributed architecture; for example, each system may include a separate N-("network") blade and D-(disk) blade (not shown). In such an embodiment, the N-blade is used to communicate with clients 22, while the D-blade includes the file system functionality and is used to communicate with the storage subsystem 28. The N-blade and D-blade communicate with each other using an internal protocol. Alternatively, each storage server 24 and 26 may have an integrated architecture, where the network and data components are all contained in a single box. Each storage server 24 and 26 further may be coupled through a switching fabric to other similar storage servers (not shown) which have their own local storage subsystems. In this way, all of the storage subsystems can form a single storage pool, to which any client of any of the storage servers has access.

Each storage server 24 and 26 includes one or more processors 32 and memory 34 coupled to a bus system 36. The bus system 36 shown in FIG. 2 is an abstraction that represents any one or more separate physical buses and/or point-to-point connections, coupled by appropriate bridges, adapters and/or controllers. The bus system 36, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor 32 is the central processing unit (CPU) of each storage server 24 and 26 and, thus, controls the overall operation of each storage server 24 and 26. In certain embodiments, the processor 32 accomplishes this by executing software stored in memory 34 (e.g., operating system 38). The processor 32 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 34 is or includes the main memory of the storage server 24 and 26. Memory 34 represents any form of random access memory (RAM), read-only memory (ROM), flash memory, or the like, or a combination of such devices. Memory 34 stores, among other things, the operating system 38 of the storage server 24 and 26, in which the access control techniques introduced herein can be implemented.

Also coupled to the processor 32 through the bus system 36 are one or more internal mass storage devices (not shown), a storage adapter 40 and a network adapter 42. The internal mass storage device may be or may include any conventional medium for storing large volumes of data in a non-volatile manner, such as one or more magnetic or optical based disks. The storage adapter 40 allows the storage server 24 and 26 to access the storage subsystem 28 and may be, for example, a Fibre Channel adapter or a SCSI adapter. The network adapter 42 provides each storage server 24 and 26 with the ability to communicate with remote devices, such as the clients 22, over a network and may be, for example, an Ethernet adapter. To avoid obscuring the invention, certain standard and well-known components that are not germane to the present invention have been omitted.

Figure 3:
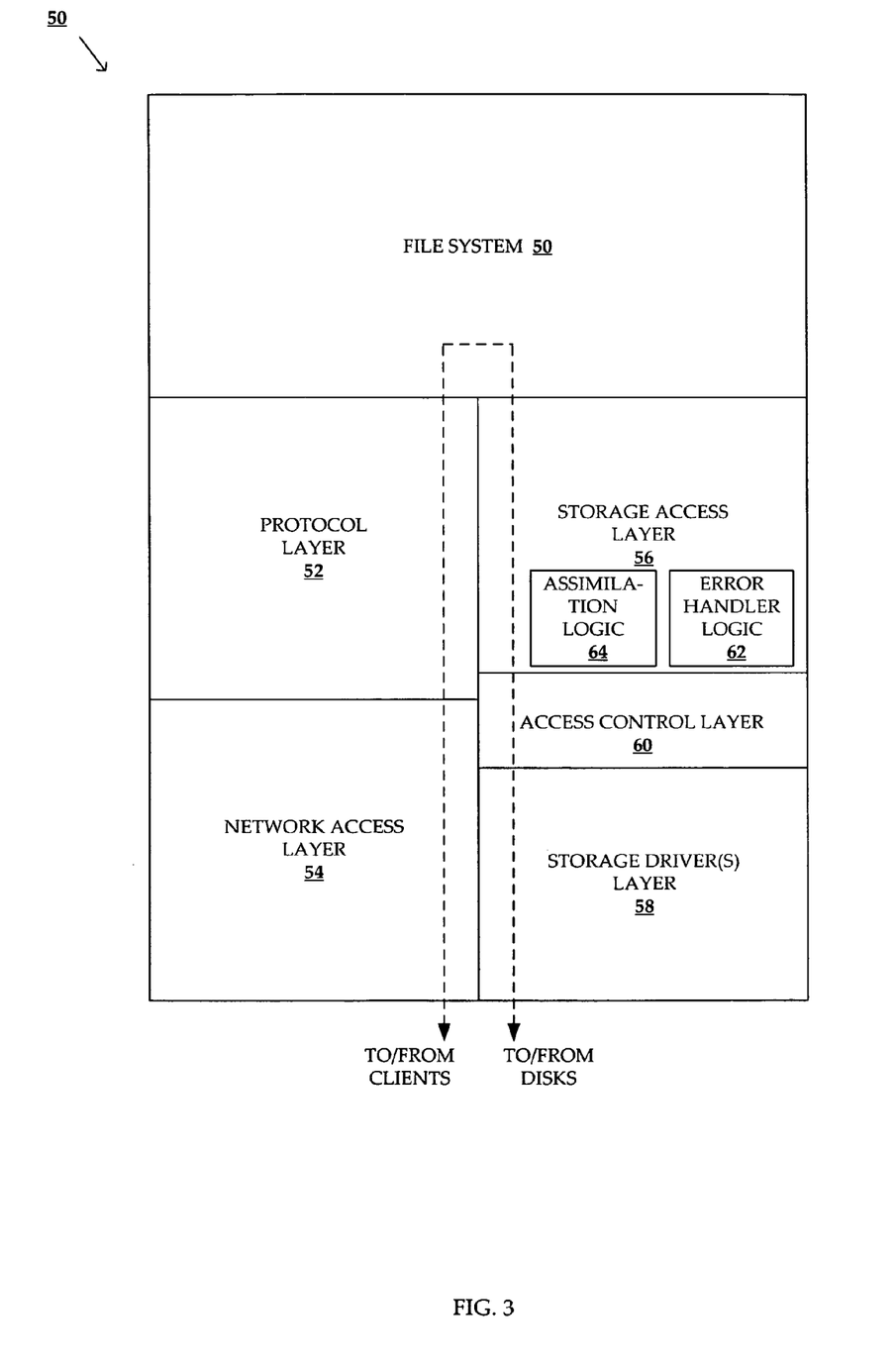
FIG. 3 illustrates an example of the operating system of each storage server in FIG. 2, according to embodiments of the invention.

FIG. 3 illustrates an example of the operating system 38 of each storage server 24 and 26. As shown, the operating system 38 (e.g., the Data ONTAP® operating system made by Network Appliance, Inc.) includes several modules, or "layers". These layers include a file system 50 (e.g., the WAFL® file system made by Network Appliance, Inc.). The file system 50 is application-layer software that keeps track of the directory structure (hierarchy) of the data stored in the storage subsystem 28. In addition, the file system 50 software works in conjunction with the access control layer 60 to read and write, in accordance with the access privileges controlled by the access control layer 60, to the pool of mass storage devices on behalf of clients. Furthermore, in one embodiment of the invention, the file system 50 may have error handler logic 62 for handling errors that occur during a read or write operation directed to the storage subsystem. In particular, the error handler logic 62 of the secondary storage server 26 may report errors to the primary storage server 24 under certain circumstances. For example, if a read operation at the secondary storage server 26 results in an error due to a media failure (e.g., bad disk block), the secondary storage server 26 may notify the primary storage server 24 about the error, so the primary storage server 24 can reconstruct the data and re-write (e.g., re-map) the data to a new location.

Logically "under" the file system 50, the operating system 38 also includes a protocol layer 52 and an associated network access layer 54, to allow the storage server 24 and 26 to communicate over the network 31 (e.g. with clients 22). The protocol layer 52 implements one or more various higher-level network protocols, such as NFS, CIFS, HTTP, TCP/IP, FCP and/or iSCSI. The network access layer 54 includes one or more drivers which implement one or more lower-level protocols to communicate over the network, such as Ethernet or Fibre Channel.

Also logically under the file system 50, the operating system 38 includes a storage access layer (e.g., RAID layer) 56, an access control layer 60 below the storage access layer 56, and an associated storage driver layer 58 below the access control layer 60, to allow the storage server 24 and 26 to communicate with the storage subsystem 28. The storage access layer 56 implements a higher-level disk storage protocol, such as RAID, while the storage driver layer 58 implements a lower-level storage device access protocol, such as Fibre Channel Protocol (FCP) or SCSI. In one embodiment of the invention, the storage access layer 56 includes error handler logic 62 and assimilation logic 64, as shown in FIG. 3.

The access control layer 60 includes logic which controls the access privileges that each storage server 24 and 26 has to the storage subsystem 28, based on the ownership of the mass storage devices in the pool of mass storage devices 30. For example, the primary storage server 24, which "owns" the pool of mass storage devices 30, may be allowed both read and write access to the pool of mass storage devices 30, whereas the secondary storage server 26, which does not "own" the pool of mass storage devices 30, is allowed only read access. Hence, the access control layer 60 identifies which storage server owns which mass storage devices and controls the access privileges accordingly. Ultimately, the access control layer 60 determines the level of access allowed to clients that direct requests to the storage servers 24 and 26.

Ownership of mass storage devices can be specified in various ways. For example, in certain embodiments, ownership may be dictated by the particular manner in which the mass storage devices 30 are physically connected to the storage servers 24 and 26. In other embodiments, ownership of a mass storage device such as a disk can be determined by software within the primary storage server 24, for example, by storing ownership information, or "labels", identifying the storage server which owns the disk in a predetermined area on each disk. A technique for storing ownership information on disk in this way is described in detail in U.S. patent application Ser. No. 10/027,457 of S. Coatney et al., filed on Dec. 21, 2001 and entitled, "System and Method of Implementing Disk Ownership in Networked Storage", published as U.S. Patent Application Publication no. 20030120743, which is incorporated herein by reference. Normally, the ownership of a mass storage device is assigned when that device is first added into the pool of mass storage devices.

Figure 4:
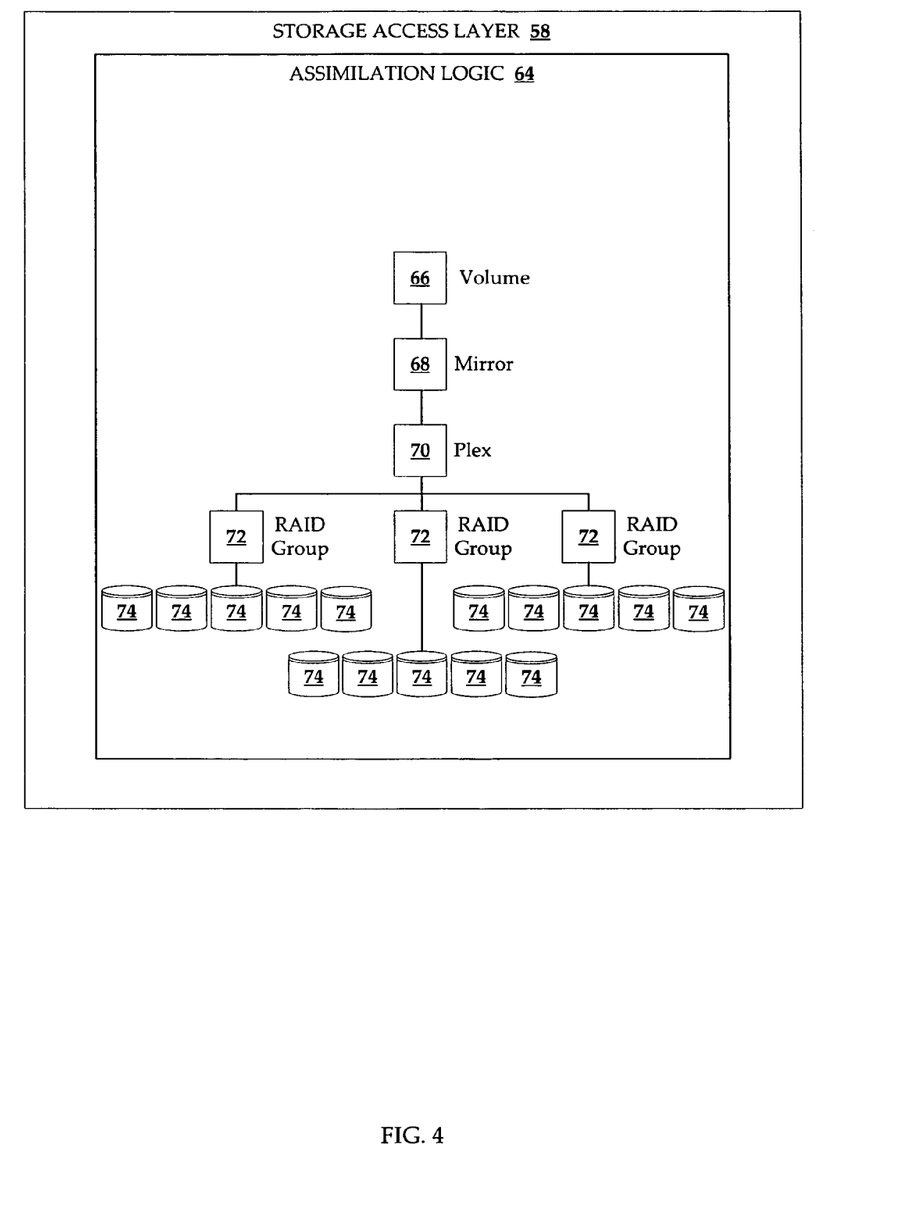
FIG. 4 illustrates an example of the storage access layer, according to embodiments of the invention.

FIG. 4 illustrates an example of the storage access layer 56, according to one embodiment of the invention. The storage access layer 56, which may implement a RAID protocol, includes assimilation logic 64 for generating one or more data storage objects (e.g., a RAID tree) that represent a logical organization of the pool of mass storage devices in the storage subsystem. In addition, the data storage object defines properties of the pool of mass storage devices, including access privileges. For example, as illustrated in FIG. 4, the assimilation logic 64 has generated a group of data objects (e.g., RAID tree) representing the pool of mass storage objects illustrated in FIG. 2. The data objects include a volume 66, a mirror 68, a plex 70, three RAID groups 72, and the individual mass storage devices 74. It will be appreciated by those skilled in the art that the data objects that represent the logical arrangement of the pool of mass storage devices may vary depending on the particular implementation. Furthermore, in an alternative embodiment, a single data object may be used in place of the group of data objects.

In one embodiment of the invention, the primary storage server 24 assimilates the pool of mass storage devices during a particular event, such as boot-up, or power on. Assimilation is the process by which the RAID subsystem within a storage server scans the disks owned by the storage server to construct logical RAID trees. Accordingly, the primary storage server 24 generates a data storage object, referred to herein as a RAID tree. The RAID tree defines the relationship between the primary storage server 24 and the pool of mass storage devices.

Similarly, the secondary storage server 26 generates a data storage object (e.g., a remote RAID tree) representing the pool of mass storage devices. According to one embodiment of the invention, in order to generate a remote RAID tree, the secondary storage server 26 is first notified of the particular RAID tree to be assimilated. For example, in one embodiment of the invention, a secondary storage server 26 generates a remote RAID tree based on an existing RAID tree. Accordingly, in one embodiment of the invention, the primary storage server 24 communicates a message to the secondary storage server 26 to notify the secondary storage server 26 of the RAID tree that has been assimilated on the primary storage server 24. In addition, the primary storage server 24 will communicate the address of a function handling routing (e.g., an error handling routine) on the primary storage server 24. The function handling routine may service requests associated with the remote RAID tree in particular circumstances, such as when errors occur during a read operation at the secondary storage server 26.

In one embodiment of the invention, the data object (or objects, e.g., 66, 68, 70, 72 and 74) that represents the pool of mass storage devices has one or more properties defining characteristics of the pool of mass storage devices. For example, one property may define the access privileges that a storage server 24 and 26 has to the shared pool of mass storage devices 30. Accordingly, in the primary storage server 24, the access control property of the RAID tree may be set with a particular value that provides the primary storage server 24 full access (e.g., read and write) to the shared pool of mass storage devices 30. Similarly, the access control property for the remote RAID tree at the secondary storage server 26 may be set with a value that provides the secondary storage server 26 only read access to the shared pool of mass storage devices 30.

After the remote RAID tree has been generated at the secondary storage server 26, client-initiated read requests received at the secondary storage server 26 that are directed to mass storage devices controlled by the remote RAID tree can be serviced. However, the secondary storage server 26 cannot write data to the pool of mass storage devices 30.

In one embodiment of the invention, if an error occurs during a read operation at the secondary storage server 26, the secondary storage server 26 will notify the primary storage server 24 of the error. Because the secondary storage server 26 cannot write data to the pool of mass storage devices 30, only the primary storage server 24 can correct a media error by re-mapping a data block to a new location (e.g., new disk block). Accordingly, upon receiving an error message from a mass storage device or devices indicating a media error, the secondary storage server 26 will "function ship" the client request that generated the error to the primary storage server 24 (e.g., the secondary storage server 26 will generate a remote procedure call (RPC) to transfer the request to the primary storage server 24). For example, error handler logic 62 executing at the secondary storage server 26 will communicate a message to the address of the function handler of the primary storage server 24. The message will include the client request that caused the error message. Accordingly, the primary storage server 24 can reconstruct the data that could not be read, and re-map the data to a new location (e.g., a new disk block).

In one embodiment, processing logic controls the state of each data storage object (e.g., RAID tree or remote RAID tree). Consequently, if a mass storage device in a particular RAID group fails, the state associated with the RAID tree representing that particular RAID group may be changed to reflect the failed mass storage device and the resulting degraded state. For example, the state associated with the RAID group may change from NORMAL to DEGRADED. This state change will generally affect the state of the RAID tree and the remote RAID tree on the primary and secondary storage servers 24 and 26, respectively. Accordingly, when operating in a degraded state, the secondary storage server 26 does degraded-mode reads, just as the primary storage server 24 does. This means that if a client read request is directed to data on the failed mass storage device, the secondary storage server 26 will read data from the other mass storage devices in the RAID group, and reconstruct the data from the failed mass storage device (e.g., by using RAID parity information).

Once the primary storage server 24 has selected a replacement mass storage device for the failed mass storage device, the state of the RAID tree at the primary storage server 24 may be changed to reflect the addition of the replacement mass storage device. For example, the state of the RAID tree at the primary storage server 24 may change from DEGRADED to RECONSTRUCTING. Moreover, the state change may be accompanied by a series of reconstruction operations that occur to reconstruct the data from the failed mass storage device, and write the data to the replacement mass storage device. However, during the reconstruction operation, the remote RAID tree of the secondary storage server 26 remains in a degraded state. Accordingly, the secondary storage server 24 is not aware of the replacement mass storage device and does not direct requests to the replacement mass storage device.

Upon completion of the reconstruction operation, the replacement disk officially replaces the failed disk in the RAID group, and the state of the RAID tree at the primary storage server 24 is changed from RECONSTRUCTING to NORMAL. At that time, the state of the remote RAID tree is changed back to NORMAL, and the secondary storage server 26 therefore resumes reading data directly from the replacement mass storage device. In one embodiment, prior to reading data from the replacement mass storage device, the secondary storage server 26 may have to re-assimilate the mass storage devices based on the RAID tree at the primary storage server 24. Accordingly, the primary storage server 24 may communicate a message to the secondary storage server 26 at the conclusion of the reconstruction operation to notify the secondary storage server 26 that it should re-assimilate the pool of mass storage devices 30 and generate a new remote RAID tree.

Figure 5:
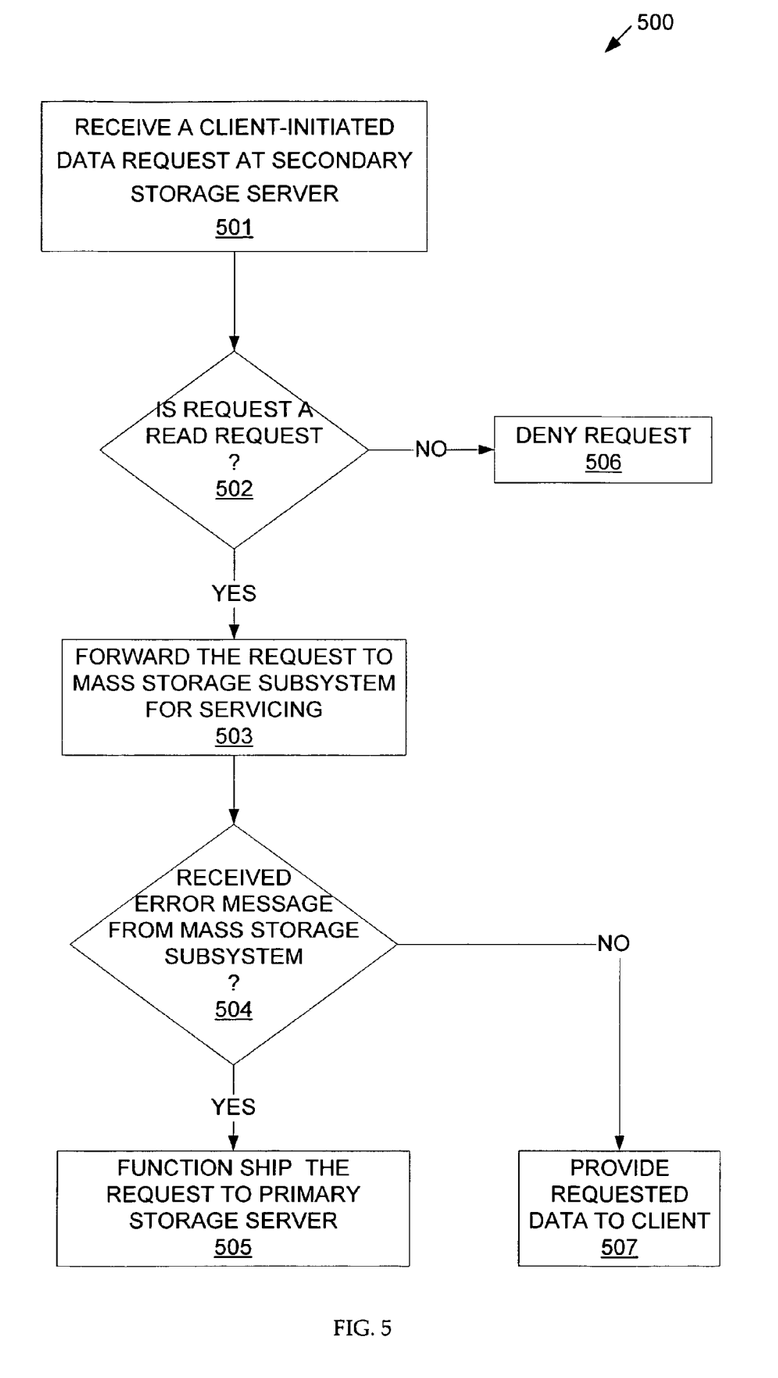
FIG. 5 illustrates a process, according to embodiments of the invention, for accessing a shared pool of mass storage devices.

FIG. 5 illustrates a process 500, according to one embodiment of the invention, by which the secondary storage server 26 can access the shared pool of mass storage devices 30. Initially, the secondary storage server 26 receives a client-initiated data request at 501. If the request is not a Read request (502) (e.g., if the request is a Write request), the request is denied. If the request is a Read request, then at 503 the secondary storage server 26 forwards the request to the mass storage subsystem 28 for servicing of the request. If the mass storage subsystem 28 responds with an error message (e.g., indicating a media error), then the secondary storage server 26 "function ships" the request to the primary storage server 24, for servicing of the request. If the response is not an error message (i.e., the response is the requested data), then the secondary storage server 26 then provides the requested data to the client at 507. Note that in the context of process 500, the "client" can be a separate client machine with which the secondary storage server 26 communicates over a network (e.g., LAN 23), or the "client" can be a process that executes within the secondary storage server 26.

Thus, a method and system for efficiently accessing a pool of mass storage devices have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A computer-implemented method comprising:
   at a secondary storage server, generating a data storage object corresponding to at least one mass storage device in a pool of mass storage devices owned by a primary storage server and not owned by the secondary storage server, wherein the data storage object includes information for representing a logical organization of the pool of mass storage devices;
   at the secondary storage server, receiving a client-initiated data request; and
   at the secondary storage server, denying access to the pool of mass storage devices if the request is a write request, and forwarding the request to the pool of mass storage devices if the request is a read request, while the primary storage server is in normal operation.

2. The computer-implemented method of claim 1, wherein the pool of mass storage devices comprises a RAID group.

3. The computer-implemented method of claim 2, wherein operating the secondary storage server to provide a client with access to the RAID group comprises providing the client with read-only access to the RAID group, and wherein the primary storage server provides read and write access to the RAID group.

4. The computer-implemented method of claim 1, further comprising
   responsive to forwarding the read request to the pool of mass storage devices, receiving an error message indicating a media error in the pool of mass storage devices; and
   communicating the error message to the primary storage server along with the client-initiated data request received at the secondary storage server.

5. The computer-implemented method of claim 4, further comprising:
   after communicating the error message to the primary storage server along with the client-initiated data request received at the secondary storage server, receiving, from the primary storage server, data satisfying the client-initiated data request, wherein the data satisfying the client-initiated data request was generated at the primary storage server during a data reconstruction operation.

6. The computer-implemented method of claim 5, wherein the data reconstruction operation is a RAID reconstruction operation.

7. The computer-implemented method of claim 1, wherein the client-initiated data request was initiated by a client coupled to the secondary storage server over a network.

8. The computer-implemented method of claim 1, wherein the client-initiated data request was initiated by a client process executing in the secondary storage server.

9. The computer-implemented method of claim 1, wherein operating the secondary storage server comprises:
at the secondary storage server, generating a data storage object representing the pool of mass storage devices in response to a message from the primary storage server, wherein the data storage object has one or more properties that control the secondary storage server's access permissions to the pool of mass storage devices.

10. A computer-implemented method for accessing a pool of mass storage devices organized as a RAID group, the pool of mass storage devices coupled to a primary storage server and a secondary storage server, the method comprising:
at the secondary storage server, receiving a first message from the primary storage server, the first message identifying the pool of mass storage devices and indicating an address of a function handler at the primary storage server; and
at the secondary storage server, generating a data storage object representing the pool of mass storage devices identified in the first message received from the primary storage server, wherein the data storage object has one or more properties that control the secondary storage server's access permissions to the pool of mass storage devices.

11. The computer-implemented method of claim 10 further comprising:
at the secondary storage server, receiving a second message from the primary storage server indicating that a particular mass storage device in the pool of mass storage devices has failed; and
responsive to receiving the second message, changing a property of the one or more properties that control the secondary storage server's access permissions to the pool of mass storage devices to indicate client-initiated read requests that are received at the secondary storage server and directed to data stored on the particular mass storage device are to be serviced by reconstructing the data stored on the particular mass storage device.

12. The computer-implemented method of claim 11, further comprising:
at the secondary storage server, receiving a third message from the primary storage server indicating that a replacement mass storage device has been added to the pool of mass storage devices to replace the particular mass storage device that has failed; and
responsive to receiving the third message, preventing all client-initiated data requests from being forwarded to the pool of mass storage devices while updating the data storage object representing the pool of mass storage devices to reflect the addition of the replacement mass storage device.

13. The computer-implemented method of claim 12, wherein updating the data storage object representing the pool of mass storage devices includes generating a new data storage object representing the pool of mass storage devices including the replacement mass storage device, wherein the new data storage object has one or more properties that control the secondary storage server's access permissions to the pool of mass storage devices including the replacement mass storage device.

14. The computer-implemented method of claim 10, further comprising:
at the secondary storage server, receiving an error message from a particular mass storage device in the pool of mass storage devices, the error message indicating an error occurred while the particular mass storage device was attempting to service a read request; and
responsive to receiving the error message, communicating the error message and the read request to the function handler at the primary storage server.

15. The computer-implemented method of claim 14, further comprising:
after communicating the error message and the read request to the primary storage server, receiving data satisfying the read request from the primary storage server.

16. A storage server comprising:
access control logic executed by the storage server to generate one or more data storage objects including information for representing a logical organization of a pool of mass storage devices shared with a primary storage server, wherein the pool of mass storage devices is owned by a primary storage server and not owned by the storage server, the one or more data storage objects including . . .
a file system controlled by the storage server to maintain a hierarchical structure of data stored in the pool of mass storage devices, receive a client-initiated data request at the storage server, and to deny access to the pool of mass storage devices if the client-initiated data request is a write request and to forward the read request to the pool of mass storage devices if the client-initiated data request is a read request, in accordance with the properties defining the access privileges of the storage server to the pool of mass storage devices.

17. The storage server of claim 16, further comprising:
error handler logic executed by the storage server to communicate from the storage server, to the primary storage server, the client-initiated read request directed to data stored in the pool of mass storage devices and an error message resulting from a media error during an attempt to service the client-initiated read request, wherein said error handler logic is also to receive from the primary storage server data satisfying the client-initiated read request, the data satisfying the client-initiated read request generated at the primary storage server by a RAID reconstruction operation.

18. The storage server of claim 16, further comprising:
error handler logic executed by the storage server to receive a status message from the primary storage server, the status message indicating failure of a particular mass storage device in the pool of mass storage devices, wherein the access control logic is to change the state of the data storage object to reflect the failure of the particular mass storage device.

19. The storage server of claim 18, wherein, responsive to the access control logic changing the state of the data storage object, the access control logic is to prevent client read requests from being forwarded to the particular mass storage device.

20. The storage server of claim 18, further comprising logic executed by the storage server to reconstruct data on the failed mass storage device, responsive to the access control logic changing the state of the data storage object.

* * * * *